Jan. 29, 1924.
J. KRUSCHITZKI
PROTECTING DEVICE FOR TWIST DRILLS
Filed Jan. 30, 1922
1,482,369
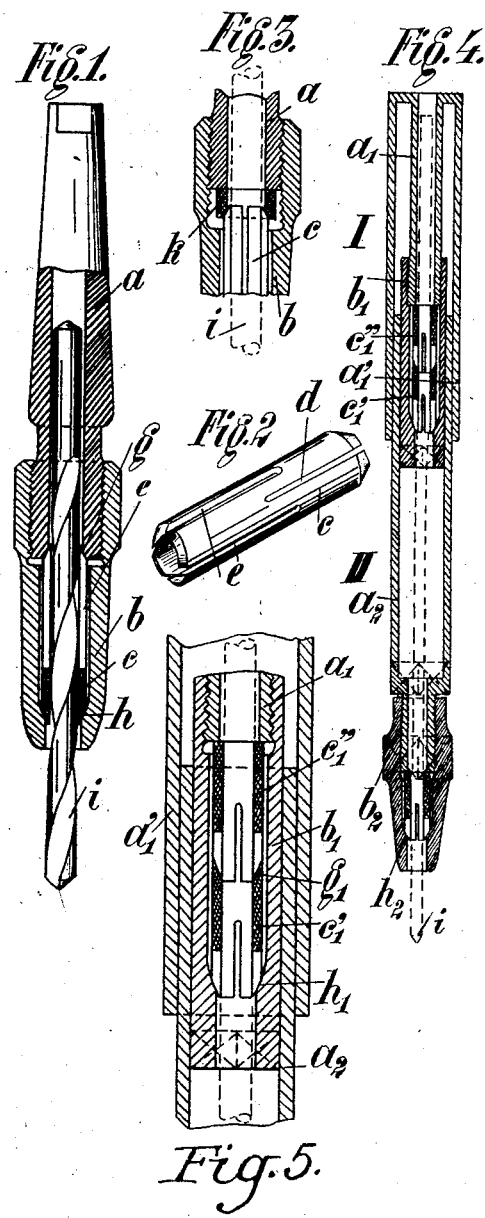

Patented Jan. 29, 1924.

1,482,369

UNITED STATES PATENT OFFICE.

JOHANN KRUSCHITZKI, OF BRESLAU, GERMANY.

PROTECTING DEVICE FOR TWIST DRILLS.

Application filed January 30, 1922. Serial No. 532,825.

*To all whom it may concern:*

Be it known that I, JOHANN KRU-SCHITZKI, a citizen of the German Republic, residing at Breslau, Germany, have invented certain new and useful Improvements in Protecting Devices for Twist Drills, of which the following is a specification.

The inconvenience caused by twist drills breaking very frequently owing to the great free length which they must have to permit the clamping in the chuck of the head end, makes itself felt much more at present on account of the high price of the tools. The protecting devices for twist drills of known type which consist of a tubular sleeve which encloses the drill almost up to the working end removes only incompletely the danger of breaking as they do not hold the drill sufficiently to exclude the vibrating of the drill. Such protecting sleeves are further not adapted to be used on drills of different diameters as they must be handled and clamped in the chuck as is usual with a small drill.

According to this invention the improved protecting sleeve is composed, similar to the clamping chuck for machine tools, of two separate parts adapted to be screwed together. These parts, in being screwed together, clamp in by means of inner conical surfaces the slit conical ends of clamping sleeves which securely hold the drill. This arrangement has various advantages. The drill, being clamped at at least two points situated at a certain distance the one from the other. the danger of the drill vibrating and breaking is excluded. The improved device can be used, within certain limits, for drills of different size and it can be easily inserted into the drilling machine with the ordinary socket, if this socket end is of convenient shape, without alteration of the machine. The protecting device with the twist drill inserted is manipulated in the same manner as the usual twist drill and, if several sets of protecting devices are used, the twist drills can remain in the same so that the insertion of the twist drill in a machine tool and the exchange for another twist drill does not require more time than at present. The improved protecting sleeve does not impede in the least the drilling operation nor the inspection of the work. As all the parts of the protecting device, inclusive the twist drill inserted in the same, remain connected even if the twist drill is not in actual use. All danger is avoided that one of the parts gets lost and the retail sale of the device is facilitated.

In order that the invention may be clearly understood, I shall proceed to describe the same with reference to the forms of construction shown by way of example, on the accompanying drawing, wherein:—

Fig. 1 shows in longitudinal section a first form of construction of the protecting device for twist drills.

Fig. 2 is a perspective view of the clamping sleeve used with the protecting device.

Fig. 3 shows a modified form of construction of a part of the protecting device shown on Fig. 1.

Fig. 4 shows in longitudinal section a further modification of the protecting device.

Fig. 5 shows part of Fig. 4 on enlarged scale.

Referring to Figs. 1 to 3 two tubular parts adapted to be screwed together, an upper part $a$ and a lower part $b$ enclose between them one or several clamping sleeves $c$ the conically tapered ends of which, having slits $d$, $e$, are acted upon by conical surfaces $g$, $h$, if the parts $a$, $b$ are being screwed together.

In the form of construction shown on Fig. 1 one single clamping sleeve is provided which is conically tapered and slit at both ends. The upper part $a$ and the lower part $b$ have each, at a convenient point, an inner conical surface $g$, $h$ which, on the screwing together of parts $a$ and $b$, grip around the ends of the clamping sleeve $c$ and clamp the same securely on the twist drill $i$, which extends through the device $f$ for almost its entire length, this drill being thus securely clamped.

For the inner conical surfaces $g$, $h$, of the tubular parts $a$, $b$ conical surfaces of rings could be substituted, said rings being axially displaced by the tubular parts $a$, $b$ if the same are being screwed together, said rings being thus pushed over the ends of the clamping sleeve $c$. On Fig. 3 a ring $k$ with conical inner surface is shown inserted between the upper part $a$ and the upper end of the clamping sleeve $c$ which, if the tubular parts $a$, $b$ are being screwed together, is pressed by the end of the tubular part $a$ upon the upper end of the clamping sleeve $c$ which in its turn, clamps the twist drill $i$. By the arrangement of the conical surfaces on separate rings which are adapted to be displaced in axial direction the danger is avoided that, at the screwing together of the two tubular parts, the thin and sensitive clamping sleeve be rotated by friction and damaged.

The forms of construction of the protecting device which have been described present the inconvenience that the depth of the hole to be bored by the drill cannot be greater than the length of the part of the drill which projects freely from the lower tubular part $b$. This inconvenience is done away with by the form of construction shown in Fig. 4, according to which two complete protecting devices, consisting each of an upper part and of a lower part, are combined with one or several intermediate clamping devices in such a manner that one protecting device grips, in a manner known per se, over the other, being adapted to be displaced upon the same in axial direction. For drilling depths which are not of greater length than that of the part of the drill projecting from the lower protecting device both protecting devices are screwed together so that they clamp the twist drill securely whereby this twist drill secures the two protecting devices against axial displacement. In this position the two protecting devices connected the one with the other act like one single protecting device. For drilling greater depths however the two protecting devices are used at first in the manner which has just been described until the projecting end of the drill has penetrated almost entirely into the work piece and is guided in the same whereupon the screw connection of the lower protecting device is loosened so that it no longer clamps the twist drill, which is now held only by the upper device. If the drilling machine spindle is further lowered, the twist drill is made to project further from the lower protecting device as this device is pressed upon the working piece and the upper protecting device being lowered with the spindle displaces itself axially upon the lower protecting device.

In Figures 4 and 5 the parts which belong to the upper protecting device I and to the lower protecting device II are distinguished from one another by the reference numerals I and II. The upper protecting device I consists of the tubular parts $a'$ and $b'$ with two intermediate clamping sleeves $c_1'$ and $c_2''$. The lower protecting device is composed of the two tubular parts $a^2$ and $b^3$ and of one single clamping sleeve $c^2$. The upper part $a^2$ of the lower protecting device II is telescoped upon the upper protecting device I and can be moved along the same, with which object in view the upper part $a'$ of the upper protecting device has an outer guide sleeve $a_1'$. The upper protecting device I clamps the drill $i$ at two points, viz, at the lower conically tapered and slit ends of the two clamping sleeves $c_1'$ and $c_1''$. If the tubular sleeves $a'$ and $b'$ are being screwed together the conical surface $h'$ of the lower tubular sleeve $b'$ acts upon the lower end of the clamping sleeve $c'$ and the conical inner surface $g'$ of the upper end of the clamping sleeve $c_1'$ acts upon the lower end of the clamping sleeve $c_1''$. The lower protecting device clamps the drill $i$ only at one single point by means of the conical surface $h^2$ of the lower tubular part $b^2$ acting upon the lower end of the clamping sleeve $c^2$, and the two tubular parts $a^2$ and $b^2$ are screwed tightly together. It is in this case not necessary to clamp at two points as the drill is held already sufficiently in the upper protecting device I. If the holes to be drilled are not to be very deep the upper protecting device I can be used alone.

The socket end of the upper part $a$ or $a'$ is cylindrical, conical, four-edged or of other shape in order to be clamped into the spindle of the boring machine or into the cutter head.

I claim:—

1. An improved device for protecting twist drills against breaking designed to be inserted with the drill into the boring machine comprising in combination two not slitted tubular parts adapted to be screwed together, an inner conical surface with adjacent enlargement in each tubular part, clamping sleeves for holding the drill accommodated and well protected in the hollow space formed by said enlargement of the two tubular parts, conically tapered slit ends of said clamping sleeves acted upon by said conical surfaces of the tubular parts when said tubular parts are being screwed together so that the drill is clamped and a rigid element independent of the boring machine is formed.

2. An improved device for protecting twist drills against breaking consisting of a protecting sleeve which encloses the drill almost upon its entire length and designed to be inserted in the spindle of the boring machine comprising in combination a protecting sleeve composed after the manner of a clamping chuck for machine tools of two tubular parts adapted to be screwed together, clamping sleeves upon the twist drill and having conically tapered slit ends, a ring inserted between each tubular part and the corresponding clamping sleeve said ring having a conical inner surface at the end turned towards said clamping sleeve and designed to act upon the conically tapered slit end of the clamping sleeve if said parts are being screwed together, so that the twist drill is securely clamped in by the ends of said clamping sleeve.

In testimony whereof I affix my signature in presence of two witnesses.

JOHANN KRUSCHITZKI.

Witnesses:
 OSCAR F. BROWN,
 ERNST METT.